W. F. CUTLER.
ELECTRIC WATER HEATER.
APPLICATION FILED MAY 5, 1919.
1,337,120.
Patented Apr. 13, 1920.
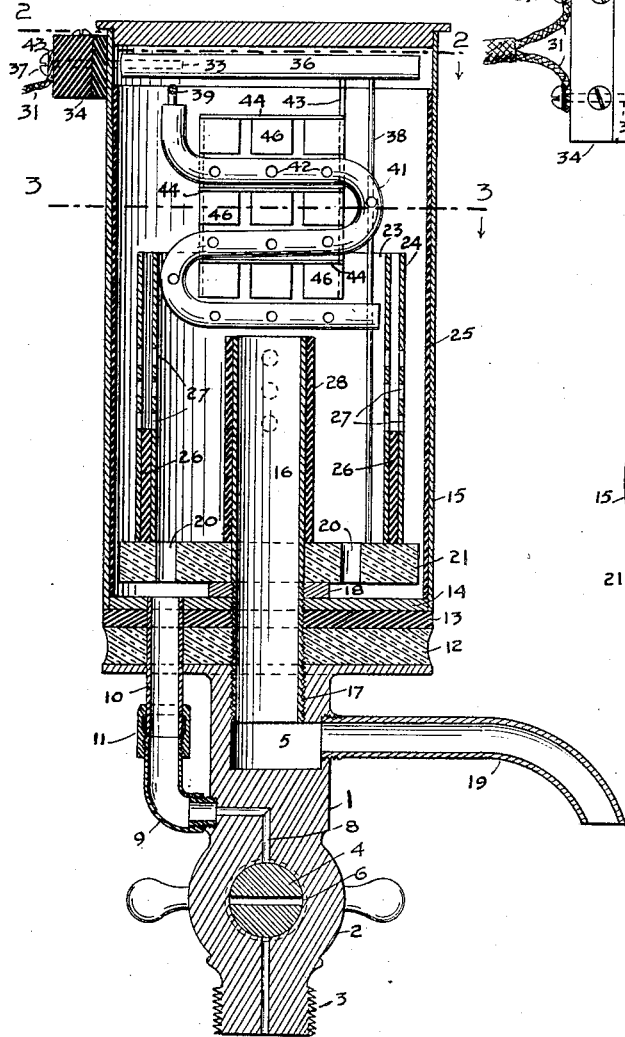
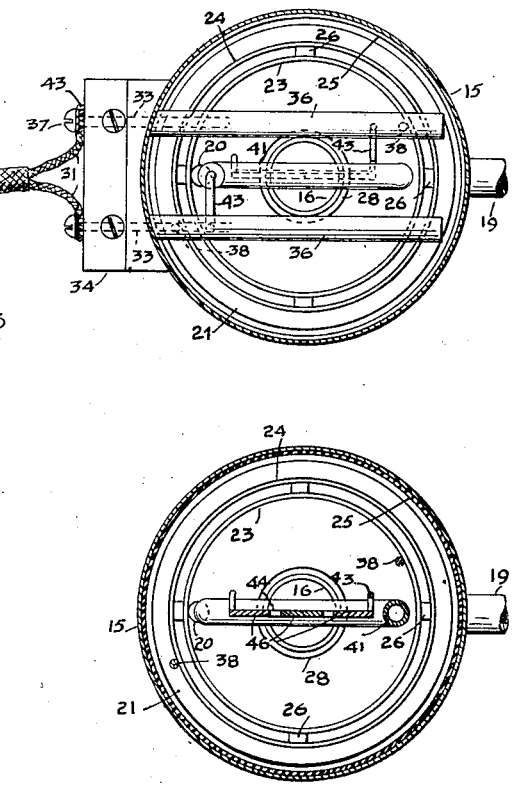
INVENTOR
W. F. CUTLER
ATT'Y

UNITED STATES PATENT OFFICE.

WILLIAM F. CUTLER, OF OAKLAND, CALIFORNIA, ASSIGNOR OF ONE-HALF TO CAPTAIN PAUL VERDIER, OF SAN FRANCISCO, CALIFORNIA.

ELECTRIC WATER-HEATER.

1,337,120.

Specification of Letters Patent.

Patented Apr. 13, 1920.

Application filed May 5, 1919. Serial No. 294,696.

*To all whom it may concern:*

Be it known that I, WILLIAM F. CUTLER, a citizen of the United States, residing at Oakland, in the county of Alameda and State of California, have invented new and useful Improvements in Electric Water-Heaters, of which the following is a specification.

The present invention relates to electric water heaters. Many such heaters have been devised, but have all been open to the objection that they require the use of very large currents of electricity, and consequently are expensive in use, and, in addition, they necessitate, in order to carry this large current, very thick wires leading from the main line wires to the heater.

The object of the present invention is to provide an electric heater which will not be open to these objections, but which will supply boiling hot water while using a current from the main wires of not more than eight amperes.

In the accompanying drawing, Figure 1 is a central vertical section of my improved electric water heater; and Figs. 2, 3, are transverse sections on the lines 2—2, 3—3, respectively of Fig. 1.

Referring to the drawing, 1 indicates a base, formed integral with a valve casing 2, the lower end of which is threaded as shown at 3, to enable it to be screwed into a supply pipe. In said casing 2 is a faucet valve 4. Through said valve extends a port 6 adapted to register either with an inlet conduit or with an outlet conduit 8 in the casing. Said outlet conduit communicates with an elbow 9, the upper end of which communicates with the lower end of a pipe 10, said communication being rendered watertight by a gland 11 screwed on to the upper end of the elbow. Upon the base 1 is supported a porcelain disk 12, upon which in turn is supported a rubber disk 13. Upon said rubber ring rests the bottom 14 of a cylindrical casing 15 in which is a central tube 16. Said casing 15 is provided interiorly with an insulating lining 25. The lower end of the tube 16 is threaded, as shown at 17, and on to the said threaded lower end a nut 18 is screwed up to the upper end of said thread. Said threaded lower end is then passed through central holes in the bottom 14 of the cylinder in the rubber disk 13, and in the porcelain disk 12, and is then screwed into a threaded cylindrical cavity 5 in the upper end of the valve casing, with which communicates a discharge faucet 19. The screwing of said lower end of the tube 16 into said valve casing presses the rubber gasket, the porcelain disk, and the bottom of the cylinder between the nut 18 and the base 1, and thus makes a watertight joint thereat.

Upon the nut 18 around the tube 16 rests a porcelain disk 21 within the cylinder having therethrough holes 20, said disk being thus spaced from the bottom of the cylinder by the thickness of the nut 18. Around the tube 16 and within the casing and resting upon the porcelain disk 21 are inner and outer co-axial cylindrical tubes 23, 24, of the same length. These co-axial tubes are preferably formed of brass coated first with a coating of tin, and then heavily coated with zinc and silver respectively. Said tubes 23, 24, are spaced by porcelain strips 26 from each other but a short distance. Fitting tightly around the upper part of the tube 16 is a tube 28 of porcelain or other insulating material. Above said strips, said inner and outer tubes are perforated, as shown at 27, the perforations being here shown at three different levels. There are four of such perforations at each level of each tube, one of them not being here shown.

Insulating wires 31 from the main are electrically connected with straight rods 38 depending closely adjacent to the inner and outer tubes 23 and 24 respectively and soldered thereto, so that said inner and outer tubes are on opposite sides of an electric circuit. From said tubes straight rods 38 depend closely adjacent to the inner and outer tubes 23, 24, respectively, and soldered thereto, so that inner and outer tubes are on opposite sides of an electric circuit. The electric circuit is completed by water between the inner and outer tubes, when the valve 4 is turned to permit water to ascend within the tube 23 above the level of the perforations 27 therein, and the electric current in passing from one of said tubes 23, 24, to the other heats the water therebetween.

The perforations 27 in the tubes 23 and 24 are important as allowing free circulation of the water and permitting it to flow down the outlet tube 16 when the level of the water reaches the top of said outlet tube and also permitting the water to flow between the two tubes 23 and 24 without having to reach the tops of said tubes. The water being the only means of conducting the electric circuit between the tube 23 and the tube 24, or conversely, the amperage of the electricity conducted will depend upon the level of the water contained between these tubes. If the water rises to a higher level, then more electricity will pass; if to a lower level, then less; hence the perforations 27 are important because they permit the free passage of the water to find its proper level between the tubes 23 and 24, and hence, to insure that the amperage varies with the level of the water.

My electric water heater is so constructed that it may be used with any current, either direct or alternating, and with any ordinary voltage, such as 70 or 220, or any intermediate voltage, without any change in the construction of the heater.

While I have herein, for the sake of brevity, termed the invention an electric water heater, it is to be understood that it can and is particularly intended to be used for pasteurizing milk and similarly heating such liquids as milk, wine and other beverages.

It will be observed that in this heater, the heat is automatically controlled within safe limits, for, should the heat generated become materially greater than 212°, the circuit is automatically broken, dry steam being then generated between the electrodes, which steam is a non-conductor of electricity.

It should be noted that the electrodes shown herein, either the tubular electrodes, or the plates and tortuous hollow tube, can be used independently of the casing, in what is known as an "immersion" heater; that is, water can be heated by immersing these electrodes therein.

An important advantage of this invention is that the interior parts can be easily removed, cleaned, and replaced when desired.

I claim:—

1. In an electric water heater, the combination of a casing, means for supplying water thereinto, an outlet tube within the casing, inner and outer perforated tubes coaxial with the outlet tube, and constituting electrodes extending to a higher level than the outlet tube, and insulating means for spacing one electrode from the other but permitting water to flow therebetween.

2. In an electric water heater, the combination of a casing, means for supplying water thereinto, an outlet tube within the casing, inner and outer perforated tubes coaxial with the outlet tube and constituting electrodes extending to a higher level than the outlet tube, and upper metallic electrodes within the casing above said tubes and closely adjacent to each other.

3. In an electric water heater, a casing, an electrode therein consisting of a perforated tube, and means for supplying water to said casing above a perforation in said tube.

Dr. WILLIAM F. CUTLER.